US012038722B2

(12) United States Patent
Hernandez et al.

(10) Patent No.: US 12,038,722 B2
(45) Date of Patent: Jul. 16, 2024

(54) ELASTIC RETAINING MEMBER FOR FASTENING A HOROLOGICAL COMPONENT TO A SUPPORT ELEMENT

(71) Applicant: Nivarox-FAR S.A., Le Locle (CH)

(72) Inventors: Ivan Hernandez, Cressier (CH); Pierre Cusin, Villars-Burquin (CH)

(73) Assignee: Nivarox-FAR S.A., Le Locle (CH)

( * ) Notice: Subject to any disclaimer, the term of this patent is extended or adjusted under 35 U.S.C. 154(b) by 512 days.

(21) Appl. No.: 17/277,542

(22) PCT Filed: Aug. 30, 2019

(86) PCT No.: PCT/EP2019/073233
§ 371 (c)(1),
(2) Date: Mar. 18, 2021

(87) PCT Pub. No.: WO2020/057943
PCT Pub. Date: Mar. 26, 2020

(65) Prior Publication Data

US 2022/0035313 A1 Feb. 3, 2022

(30) Foreign Application Priority Data

Sep. 21, 2018 (EP) .................................... 18196010

(51) Int. Cl.
*G04B 17/34* (2006.01)
*G04B 17/06* (2006.01)

(52) U.S. Cl.
CPC ......... *G04B 17/345* (2013.01); *G04B 17/063* (2013.01)

(58) Field of Classification Search
CPC .... G04B 17/345; G04B 17/063; G04B 17/32; G04B 17/34; G04B 17/325
See application file for complete search history.

(56) References Cited

U.S. PATENT DOCUMENTS 11,906,930 B2 * 2/2024 Hernandez ............. G04B 17/34
2013/0047437 A1 2/2013 Daout
(Continued)

FOREIGN PATENT DOCUMENTS

CH 706 639 A2 12/2013
CN 1439939 A 9/2003
(Continued)

OTHER PUBLICATIONS

International Search Report dated Oct. 16, 2019 in PCT/EP2019/073233 filed on Aug. 30, 2019, citing references AA-AC and AO-AQ therein, 2 pages.
(Continued)

*Primary Examiner* — Edwin A. Leon
*Assistant Examiner* — Jason M Collins
(74) *Attorney, Agent, or Firm* — Oblon, McClelland, Maier & Neustadt, L.L.P.

(57) ABSTRACT

An elastic retaining member is for attaching a horological component to a support element. The retaining includes an opening into which the support element is capable of being inserted. The retaining member also includes rigid arms and elastic arms defined between the connection zones of the retaining member. The arms contribute to procuring elastic gripping of the support element in the opening, each rigid arm being provided with a single convex contact zone of the retaining member capable of engaging with a corresponding convex contact portion of the support element.

21 Claims, 2 Drawing Sheets

(56) References Cited

U.S. PATENT DOCUMENTS

| | | | |
|---|---|---|---|
| 2015/0023140 A1 | 1/2015 | Daout et al. |
| 2018/0107162 A1 | 4/2018 | Hernandez et al. |

FOREIGN PATENT DOCUMENTS

| | | | |
|---|---|---|---|
| CN | 101539754 | A | 9/2009 |
| CN | 103197526 | A | 7/2013 |
| CN | 103926823 | A | 7/2014 |
| CN | 104898398 | A | 9/2015 |
| CN | 106257347 | A | 12/2016 |
| CN | 107490950 | A | 12/2017 |
| CN | 107942639 | A | 4/2018 |
| EP | 3 098 669 | A1 | 11/2016 |
| EP | 3 309 625 | A1 | 4/2018 |
| JP | 2013-234901 | A | 11/2013 |
| JP | 2017-227574 | A | 12/2017 |
| JP | 2018-63250 | A | 4/2018 |
| WO | WO 2011/116486 | A1 | 9/2011 |
| WO | WO 2013/045706 | A2 | 4/2013 |

OTHER PUBLICATIONS

Office Action dated May 17, 2022, in corresponding Japanese Patent Application No. 2021-514591 (with English Translation), citing documents AO and AP therein, 8 pages.

Written Opinion of the International Searching Authority dated Mar. 23, 2021 in PCT/EP2019/073233 (submitting English translation only). 7 pages.

Combined Chinese Office Action and Search Report dated Sep. 14, 2021 in Patent Application No. 201980062000.5 (with English language translation and English translation of Category of Cited Documents), citing documents AL-AV therein, 15 pages.

* cited by examiner

ELASTIC RETAINING MEMBER FOR FASTENING A HOROLOGICAL COMPONENT TO A SUPPORT ELEMENT

CROSS-REFERENCE TO RELATED APPLICATIONS

The present application is a national stage entry of International Application No. PCT/EP2019/073233, filed Aug. 30, 2019, which claims priority to European Patent Application No. 18196010.5, filed on Sep. 21, 2018, the entire content and disclosure of each of which are incorporated by reference herein.

FIELD OF THE INVENTION

The invention relates to an elastic retaining member for fastening a horological component to a support element.

The invention further relates to a combined elastic retaining member—horological component unit and to an assembly of such a unit with the support element.

The invention further relates to a method for producing such an assembly.

The invention also relates to a horological movement comprising at least one such assembly.

Finally, the invention relates to a timepiece comprising such a movement.

BACKGROUND OF THE INVENTION

In the prior art, elastic retaining members such as horological collets are known, which contribute to the assembling of balance-springs on balance-staffs in a horological movement by elastic gripping.

However, such elastic retaining members have the major drawback of imposing, as regards the production of such assemblies, complex, long and expensive assembly operations since these members have low and limited retaining torques on these balance-staffs.

SUMMARY OF THE INVENTION

The purpose of the present invention is to overcome all or part of the aforementioned drawbacks by proposing an elastic retaining member that has a high retaining torque, in particular for easing/simplifying the assembling of an assembly of a combined elastic retaining member—horological component unit with a support element as well as to provide sufficient retention to guarantee that the position thereof in the plane and the angular position thereof are maintained throughout the life of the component.

For this purpose, the invention relates to an elastic retaining member for fastening a horological component to a support element, comprising an opening into which said support element is capable of being inserted, the retaining member comprising rigid arms and elastic arms defined between connection zones of said member, said arms contributing to procuring elastic gripping of the support element in the opening, each rigid arm being provided with a single convex contact zone of the retaining member capable of engaging with a corresponding convex contact portion of the support element.

Thus, thanks to these features, the elastic retaining member is capable of withstanding significant high elastic gripping and thus of accumulating a large quantity of elastic energy when stressed so as to release a high retaining torque, in particular thanks to a high rigidity of this elastic retaining member in particular induced by large volumes (or quantities) of material constituting the rigid arms thereof, which comprise the internal and external structures. It should be noted that these large volumes of material are more specifically comprised in the contact zones which are loaded (or stressed) during the insertion of the support element into this retaining member.

Moreover, this elastic retaining member can be seen to be configured such that this accumulation of elastic energy results in allowable stresses as regards the material used to form such a retaining member, such as silicon.

In other embodiments:

- each contact zone is defined on an inside face of each rigid arm of the retaining member by extending over all or part of a thickness of this retaining member;
- each contact zone is capable of engaging with the corresponding contact portion of the support element by being in a convex-convex type contact configuration;
- the elastic retaining member comprises as many contact zones as there are contact portions;
- the elastic retaining member comprises as many rigid arms as there are elastic arms;
- the rigid arms and the elastic arms are arranged in the retaining member in a successive and alternating manner;
- the two opposite ends of each rigid arm are connected to two different elastic arms;
- the volume of material of each rigid arm is greater than the volume of material used to form each elastic arm;
- the cross-section of each elastic arm is smaller than the cross-section of each rigid arm;
- the cross-section of each elastic arm is constant throughout the body of this elastic arm;
- the elastic retaining member comprises an attachment point for attachment to the horological component;
- the elastic retaining member is a collet for fastening the horological component such as a balance-spring to a support element such as a balance-staff;
- the elastic retaining member is made of a silicon-based material.

The invention further relates to the combined elastic retaining member—horological component unit for a horological movement of a timepiece comprising such a retaining member.

Advantageously, the unit is a one-piece unit.

The invention further relates to an assembly for a horological movement of a timepiece comprising a combined elastic retaining member—horological component unit fastened to a support element.

The invention further relates to a horological movement comprising at least one such assembly.

The invention further relates to a timepiece comprising such a horological movement.

The invention further relates to a method for producing an assembly of the combined elastic retaining member—horological component unit with the support element, comprising:

- a step of inserting the support element into the opening of the elastic retaining member of said unit, said step comprising a sub-step of elastically deforming the elastic retaining member provided with a phase of displacing the rigid arms of the elastic retaining member inducing a twofold elastic deformation of the elastic arms of this elastic retaining member, and a step of fastening the retaining member to the support element comprising a sub-step of carrying out radial elastic gripping of the retaining member on the support element.

BRIEF DESCRIPTION OF THE DRAWINGS

Other specific features and advantages will be clearly observed in the following description, which is given as a rough guide and in no way as a limited guide, with reference to the accompanying figures, in which.

DETAILED DESCRIPTION OF THE PREFERRED EMBODIMENTS

Figure 1:
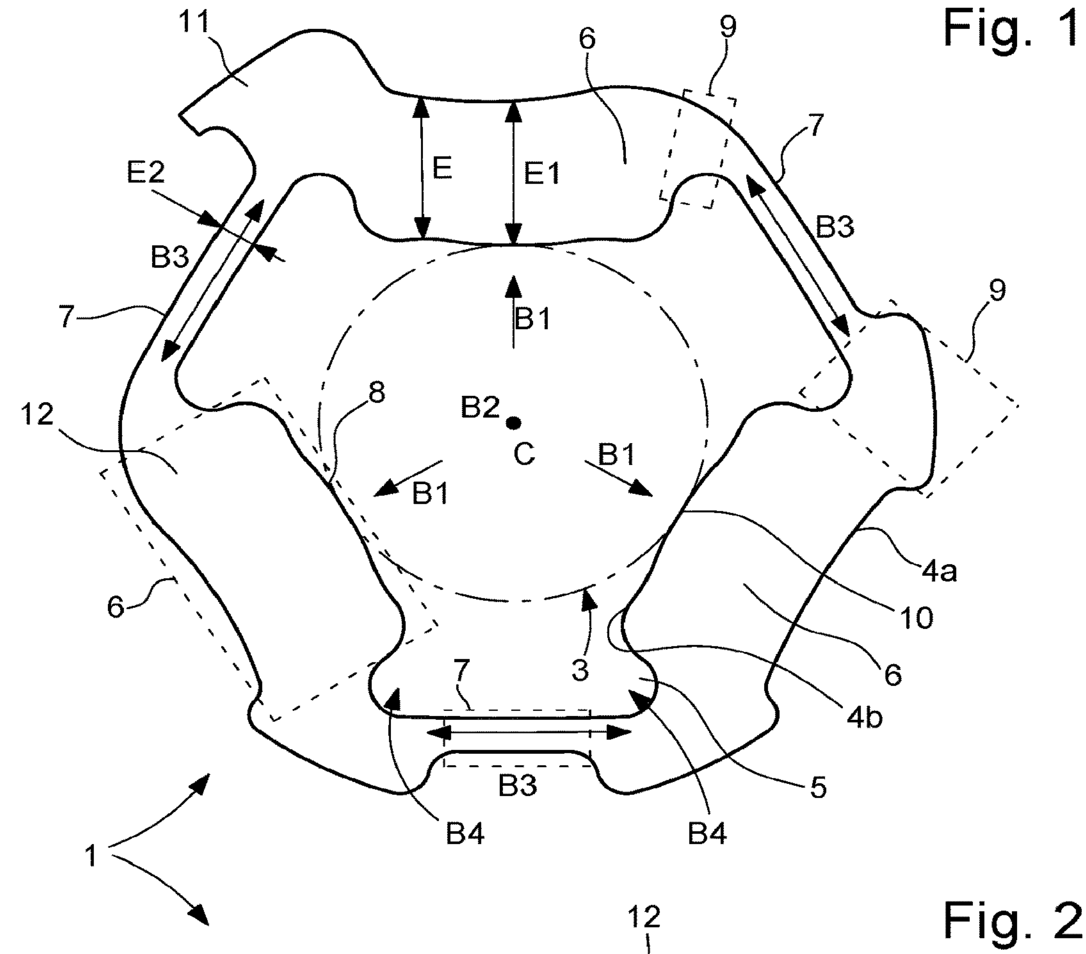
FIG. 1 is a front view of an elastic retaining member for fastening a horological component to a support element which is, in this case, in a stressed state, according to one embodiment of the invention.
Figure 2:
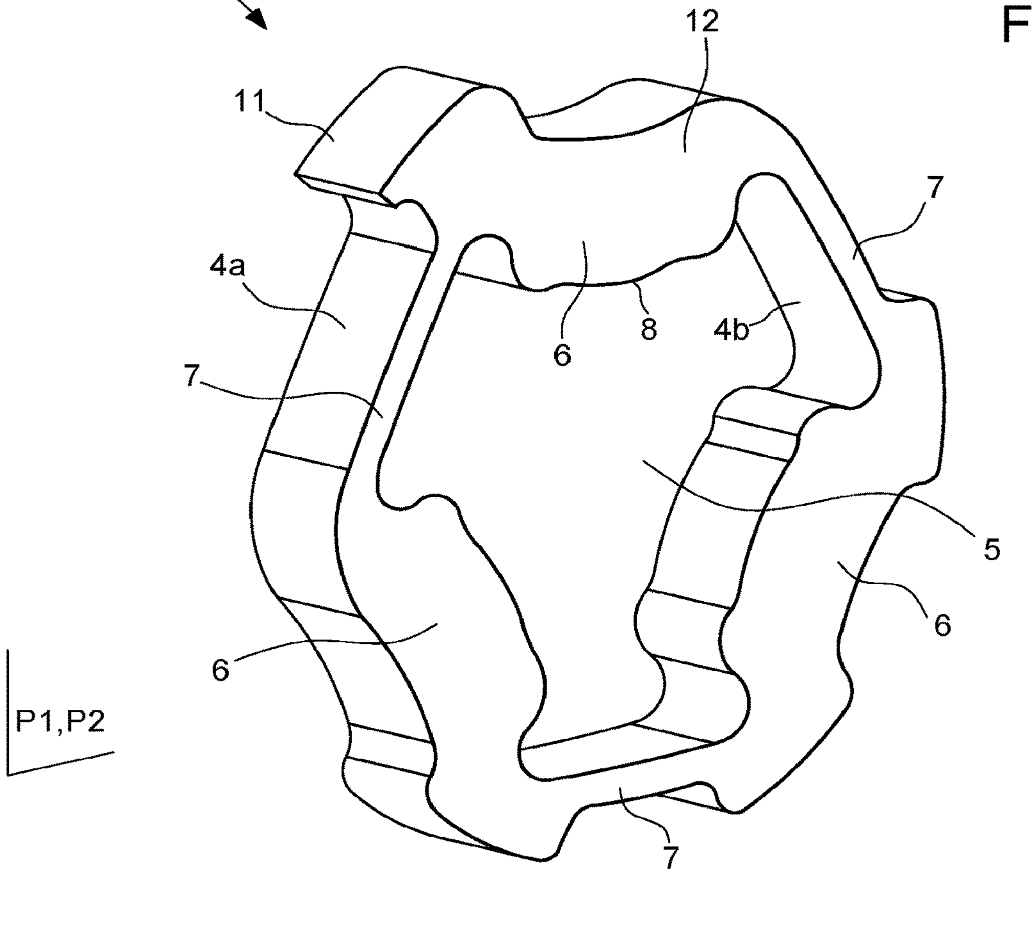
FIGS. 2 and 3 are perspective views of the elastic retaining member for fastening the horological component to the support element which are, in this case, in a resting state, according to the embodiment of the invention.
Figure 3:
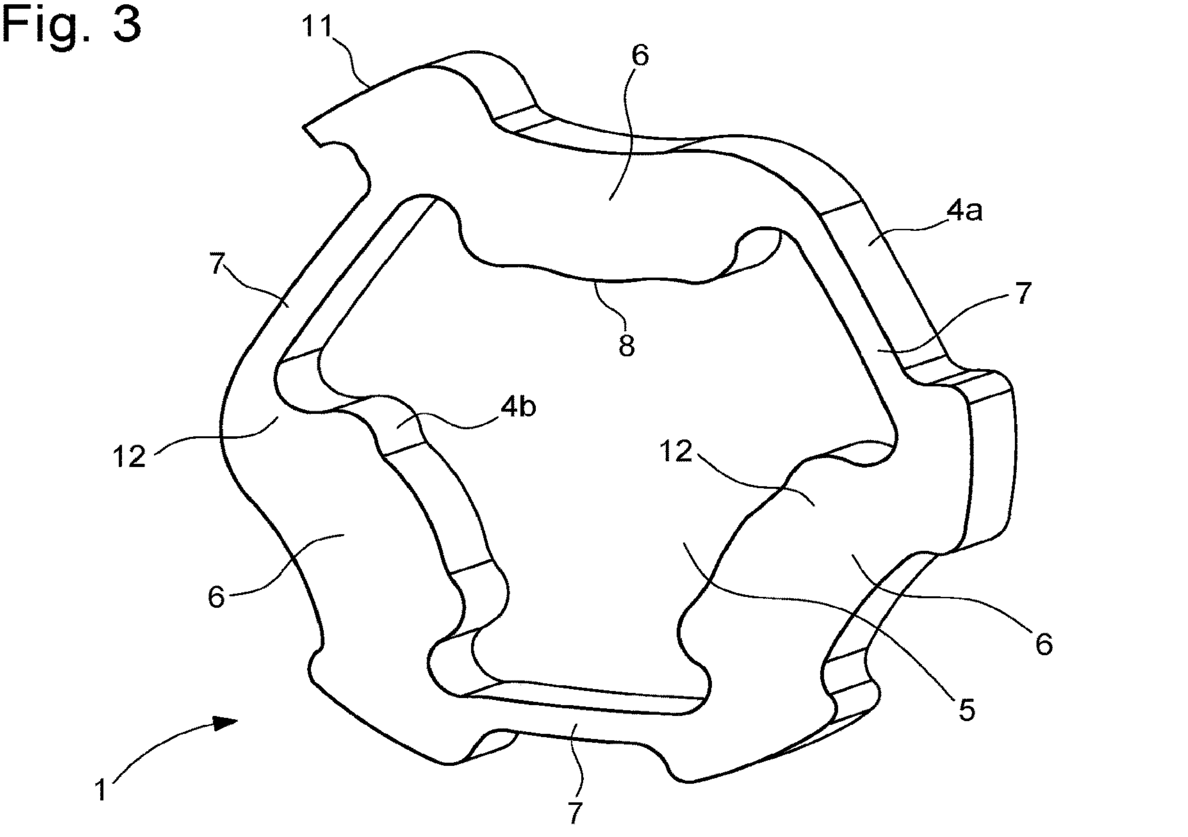

FIGS. 1 to 3 show one embodiment of the elastic retaining member 1 for fastening a horological component 2 to a support element 3. By way of illustration, the elastic retaining member 1 can be a collet for fastening the horological component 2 such as a balance-spring to a support element 3 such as a balance-staff.

Figure 4:
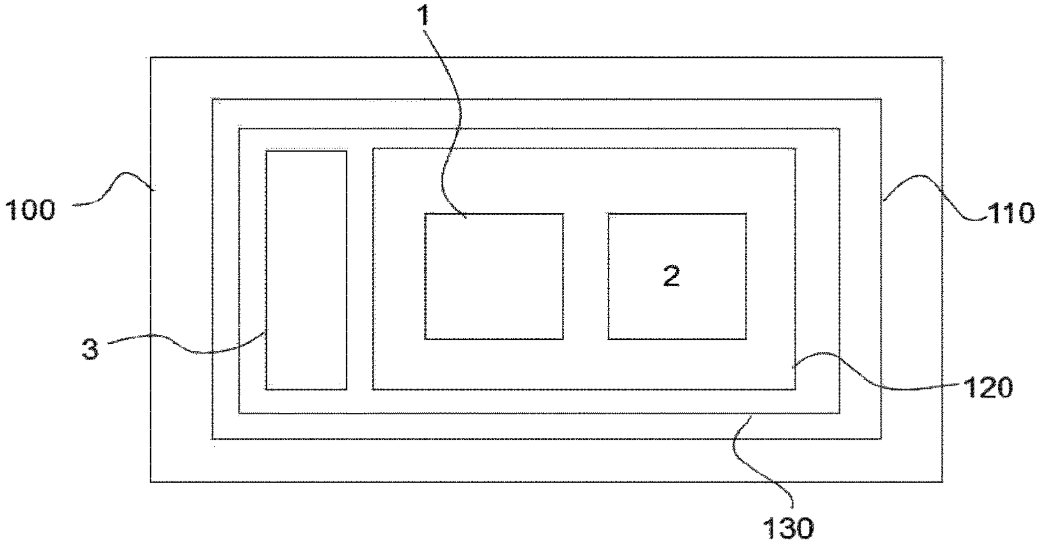
FIG. 4 shows a timepiece comprising a horological movement provided with at least one assembly comprising a combined elastic retaining member—horological component unit fastened to a support element, according to one embodiment of the invention.

In this embodiment, this retaining member 1 can be comprised in a combined elastic retaining member—horological component unit 120 shown in FIG. 4 and which is intended to be arranged in a horological movement 110 of a timepiece 100. Such a unit 120 can be a one-piece unit made of a so-called "fragile" material, preferably a micro-machinable material. A material of this type can comprise silicon, quartz, corundum or ceramics.

It should be noted that, in an alternative embodiment of this unit, only the elastic retaining member 1 can be made of such a so-called "fragile" material, the horological component 2 thus being made of another material.

This unit 120 can form part of an assembly 130 for the horological movement 110 by being fastened to the support element 3, for example by elastic gripping. It should be noted that this assembly 130 was conceived for application in the horological field. However, the invention can be perfectly well implemented in other fields such as aviation, jewellery or the motor industry.

Such a retaining member 1 comprises a top face and a bottom face 12, preferably planar, respectively comprised in first and second planes P1 and P2 shown in FIG. 2, as well as external and internal structures 4*a*, 4*b*. These external and internal structures 4*a*, 4*b* respectively comprise external and internal peripheral walls of this retaining member 1 and have different shapes. More specifically, concerning the external structure 4*a*, they can take an overall hexagonal shape and in particular comprise portions having convex shapes. Each of these portions is comprised in a connecting zone 9 connecting an elastic arm 7 to a rigid arm 6. The elastic 7 and rigid 6 arms each being an elongate-shaped part which connects together parts of the retaining member 1. In other words, a rigid arm or an elastic arm extends longitudinally between two connection zones 9. In this context, when referring to elastic arms 7, the parts of the member 1 which are connected together are the rigid arms 6, this connection being produced at the connection zones 9. Similarly, when referring to rigid arms 6, the parts of the member 1 which are connected together are the elastic arms 7, this connection obviously being produced in the connection zones 9. It is therefore understood that each rigid arm is directly connected at each of its two opposite ends to an elastic arm. It will be noted that each rigid and elastic arm which are directly connected together comprise the connection zone 9 that they share and at which the end of one is directly connected to the end of the other. In addition, it is therefore understood that the elastic and rigid arms are arranged in successively and alternatingly in the retaining member. Each rigid arm is connected to two different elastic arms, which elastic arms are "directly" connected to the other rigid arms of the member 1.

This external structure 4*a* is in particular intended to be connected to the horological component 2 via at least one attachment point 11 arranged in the external peripheral wall of the retaining member 1. The internal structure 4*b* has a non-triangular shape. This internal structure 4*b* comprised in the internal peripheral wall of this retaining member 1 contributes to defining an opening 5 of such a retaining member 1 into which the support element 3 is intended to be inserted. This opening 5 defines a volume in the retaining member 1 which is less than that of a connecting portion of one end of the support element 3 which is intended to be arranged therein. It should be noted that this connecting part has a circular cross-section and comprises, partly or entirely, contact portions 10 defined on the peripheral wall 13 of the support element 3.

This retaining member 1 comprises rigid arms 6 and elastic arms 7 connecting the external and internal structures 4*a*, 4*b* to one another. It should be noted that this retaining member 1 comprises as many rigid arms 6 as there are elastic arms 7. The rigid arms 6 are, in this case, non-deformable or quasi-non-deformable and act as stiffening elements of the retaining member 1. The elastic arms 7 are capable of being deformed, mainly under traction, but also under torsion. These rigid arms 6 and these elastic arms 7 are defined or are distributed in a successive and alternating manner in this retaining member 1. In other words, these rigid arms 6 are connected to one another by said elastic arms 7. More specifically, each elastic arm 7 is connected, at the two opposite ends thereof, at connecting zones 9 to two different rigid arms 6. Such rigid and elastic arms 6, 7 comprise, in a non-limiting and non-exhaustive manner:

- inside faces comprised in the internal structure 4*b* and which act to jointly define the internal peripheral wall of the retaining member 1 and thus additionally the opening 5 of this retaining member 1, and
- outside faces comprised in the external structure 4*a* and which jointly define the external peripheral wall of this retaining member 1.

It should be noted that the inside faces of the elastic arms 7 are substantially planar and that the inside faces of the rigid arms 6 are non-planar, for example substantially corrugated. In this embodiment, the contact zone 8 which has a rounded or convex shape is arranged between two hollow or concave portions of the inside face of each rigid arm 6. In other words, the inside face of each rigid arm 6 can take a corrugated shape, for example by comprising three apexes and two hollows with one of the three apexes, preferentially the so-called "central" apex, being arranged between the other two apexes, in a substantially symmetric manner, which comprises the convex contact zone 8 of the retaining member 1. Such a contact zone 8 is defined in the inside face of each rigid arm 6 and extends substantially over all or part of the thickness of the retaining member 1. It should be noted that the convex contact zones 8 of the rigid arms 6 are in particular intended to engage with the convex contact portions 10 according to a convex-convex type contact configuration, in which configuration the convex surface of each contact zone 8 engages with the corresponding convex-shaped portion of the support element 3. It should be specified here that this convex shape of each contact portion 10 is assessed relative to the convex surface of each corresponding contact zone 8 facing which this portion 10 is arranged.

In this configuration, the presence of this contact zone 8 in the inside face of each rigid arm 6 allows a contact pressure to be applied between the retaining member 1 and the support element 3 when producing a mechanical connection therebetween, while significantly reducing the intensity of the stresses at this contact zone 8 and the corresponding contact portion 10 of the support element 3 during the assembly and/or fastening of this retaining member 1 with the support element 3, which stresses are capable of damaging the retaining member 1 through the appearance of fractures/breaks or cracks.

In this embodiment, the rigid and elastic arms 6, 7 connect the external and internal structures 4*a*, 4*b* to one another, each of which moreover comprises a part of these external and internal structures 4*a*, 4*b*. In this retaining member 1, these rigid and elastic arms 6, 7 substantially allow for a fastening of the elastic gripping type to be produced for the support element 3 in the opening 5 made in this retaining member 1, which is defined by the internal structure 4*b* and in particular by the internal peripheral wall of this retaining member 1.

As shown, these rigid arms 6 thus comprise the sole contact zones 8 of the retaining member 1 with the support element 3 which can be defined in all or part of the inside faces of these rigid arms 6. The contact zone 8 of each rigid arm 6, otherwise referred to as the "contact interface", is intended to engage with a peripheral wall 13 of the connecting portion of the support element 3, in particular with the corresponding contact portion 10 defined in this peripheral wall 13 of the support element 3. In this context, the retaining member 1 thus comprises three contact zones 8 which contribute to the precise centring of the horological component 2, for example a balance-spring, in the horological movement 110.

In this retaining member 1, each rigid arm 6 has a volume of material that is substantially greater than or strictly greater than the volume of material used to make each elastic arm 7. Moreover, it will be observed that the elasticity or rigidity of an arm in this retaining member 1 is defined in a relative manner in the contact zones 8 of this member 1, more precisely relative to the amplitude of the deformation of these rigid or elastic arms when a force is applied on these contact zones 8. More specifically, it should be noted that the external and internal structures 4*a*, 4*b*, and in particular the internal and external peripheral walls, are separated from one another in this retaining member 1 by a variable gap E which then evolves depending on whether these structures are comprised, for example, in a rigid arm 6 or an elastic arm 7. More specifically, this gap E is a maximum gap E1 when it is defined between portions of internal and external peripheral walls that are comprised in each rigid arm 6, i.e. the maximum gap E1 present between the inside and outside faces of this rigid arm 6. In particular, for each rigid arm 6, this maximum gap E1 is defined between the contact zone 8 of each rigid arm 6 and an opposite part of the external peripheral wall of this rigid arm 6. Moreover, this gap E is a minimum gap E2 when it is defined between portions of the external and internal peripheral walls that are comprised in the elastic arms 7, i.e. the minimum gap E2 present between the inside and outside faces of this elastic arm 7.

It is thus understood here that the cross-section of each elastic arm 7 is smaller than the cross-section of each rigid arm 6. In other words, the cross-section of each elastic arm 7 has a surface area that is smaller than a surface area of the cross-section of each rigid arm 6. It should be noted that the cross-section of the elastic arm 7 is constant or substantially constant throughout the body of this elastic arm 7, whereas the cross-section of the rigid arm 6 is non-constant/variable throughout the body of this rigid arm 6. Additionally, it should be noted that:

- the cross-section of each rigid arm 6 is preferably a solid or partly solid section perpendicular to the longitudinal direction in which the body of this rigid arm 6 extends, and
- the cross-section of each elastic arm 7 is preferably a solid or partly solid section perpendicular to the longitudinal direction in which the body of this elastic arm 7 extends.

Such a configuration of rigid and elastic arms 6, 7 allows the retaining member 1 to accumulate a larger quantity of elastic energy for the same gripping compared to the retaining members of the prior art. Such a quantity of elastic energy accumulated in the retaining member 1 thus allows a higher retaining torque to be obtained for the retaining member on the support element 3 in the assembly 130 of the combined retaining member—horological component unit 120 with this support element 3. Furthermore, it should be noted that such a configuration of the retaining member 1 allows for the storage of elastic energy ratios that are 6 to 8 times greater than those of the retaining members of the prior art.

It should be noted that the arrangement of the rigid and elastic arms 6, 7 in the retaining member 1 allows, during insertion with gripping, for a deformation of each elastic arm 7 enabling the deformation of the entire retaining member 1 to be accommodated with the geometry of the connecting portion of the support element 3 on which it is assembled. Moreover, the deformation mode that each elastic arm undergoes is a toroidal torsion coupled with a radial expansion.

Figure 5:
FIG. 5 shows a method for producing such an assembly of a combined elastic retaining member—horological component unit with a support element.

With reference to FIG. 5, the invention further relates to a method for producing the assembly 130 of the combined elastic retaining member—horological component unit 120 with the support element 3. This method comprises a step 13 of inserting the support element 3 in the opening 5 of the retaining member 1. During this step 13, the end of the support element is presented before the entrance of the opening 5 defined in the bottom face 12 of the retaining member 1 in view of inserting the connecting portion of this support element 3 into the volume defined in this opening 5. This step 13 comprises a sub-step 14 of elastically deforming the retaining member 1, in particular a central zone of this retaining member 1 comprising said opening 5 resulting from the application of a contact force in the contact zones 8 of the rigid arms 6 by the contact portions 10 of the peripheral wall 13 of the connecting portion of the support element 3. This elastic deformation of the central zone results in a deformation of the bottom face 12 of the retaining member 1, which thus has a substantially concave shape, in particular at one portion of this face 12 that is comprised in the central zone of the retaining member 1. In other words, when the central zone of the retaining member 1 is deformed, this bottom face 12 is no longer planar and is thus no longer entirely comprised in the second plane P2.

As stipulated hereinabove, this elastic deformation of the retaining member 1 results from the application of the contact force in the contact zones 8 of the rigid arms 6 by the contact portions 10 of the peripheral wall 13 of the support element 3. Such a deformation sub-step 14 comprises a phase 15 of displacing the rigid arms 6 under the effect of the contact force applied thereto. Such a displacement of the rigid arms 6 takes place in a direction that is comprised between a radial direction B1 relative to a central axis C shared by the support element 3 and the retaining member 1, and a direction B2 aligned with this central axis C. It should be noted that this direction B2 is perpendicular to the direction B1 and is oriented in a defined sense from the bottom face 12 towards the top face. The contact force is preferably perpendicular or substantially perpendicular to said contact zone 8. During the execution of this phase 12, the rigid arms 6 thus undergoing displacement under the effect of this contact force result in a twofold elastic deformation of the elastic arms 7.

A first deformation, otherwise referred to as "torsional elastic deformation" of these elastic arms 7. During this torsional deformation, each elastic arm 7 is driven, at the two ends thereof, in the same direction of rotation B4 by the rigid arms 6 undergoing displacement, to which arms 6 such ends are connected. It should be noted that only part of the body of these elastic arms 7 is torsionally deformable, in this case the ends of these arms 7. Such a first deformation in particular contributes to improving the insertion of the support element 3 into the opening 5 of the retaining member 1 by helping prevent any breaking of the retaining member 1 and/or the appearance of any crack in this member 1 during the assembly thereof with the support element 3.

A second deformation, otherwise referred to as "tensile deformation" or "elongation elastic deformation" of the elastic arms 7. During this elongation deformation, each elastic arm 7 is drawn, at the two ends thereof, in the longitudinal direction B3 in opposite senses by the rigid arms 6 undergoing displacement, to which arms 6 such ends are connected. Such a second deformation in particular contributes to ensuring that the retaining member 1 accumulates a large quantity of elastic energy.

This two fold elastic deformation of the elastic arms 7 can take place simultaneously or substantially simultaneously, or can take place successively or substantially successively. It should be noted that, within the scope of implementing the deformation phase, when this twofold elastic deformation takes place in a successive or substantially successive manner, the first deformation can thus occur before the second deformation.

This method then comprises a step 16 of fastening the retaining member 1 to the reinforcing element 3. Such a fastening step 16, in particular by radial elastic gripping, comprises a sub-step 17 of carrying out radial elastic gripping of the retaining member 1 on the support element 3. It is thus understood that, in such a stressed state, the retaining member 1 stores a large quantity of elastic energy, which contributes to procuring a high retaining torque in particular allowing optimal collet attachment by elastic gripping.

The invention claimed is:

1. An elastic retaining member for fastening a horological component to a support element, comprising:

an opening into which said support element is configured of being inserted;

rigid arms and elastic arms defined between connection zones of the retaining member, the rigid arms and elastic arms contributing to procuring elastic gripping of the support element in the opening, each of the rigid arms being provided with a single convex contact zone of the retaining member to engage with a corresponding convex contact portion of the support element.

2. The elastic retaining member according to claim 1, wherein each of the contact zones is defined on an inside face of each of the rigid arms of the retaining member by extending over all or part of a thickness of the retaining member.

3. The elastic retaining member according to claim 1, wherein each of the contact zones is configured to engage with the corresponding contact portion of the support element by being in a convex-convex contact configuration.

4. The elastic retaining member according to claim 1, further comprising as many contact zones as there are contact portions.

5. The elastic retaining member according to claim 1, further comprising as many rigid arms as there are elastic arms.

6. The elastic retaining member according to claim 1, wherein the rigid arms and the elastic arms are arranged in the retaining member in a successive and alternating manner.

7. The elastic retaining member according to claim 1, wherein two opposite ends of each of the rigid arms are connected to two different elastic arms.

8. The elastic retaining member according to claim 1, wherein the volume of material of each of the rigid arms is greater than the volume of material used to form each of the elastic arms.

9. The elastic retaining member according to claim 1, wherein the cross-section of each of the elastic arms is smaller than the cross-section of each of the rigid arms.

10. The elastic retaining member according to claim 1, wherein the cross-section of each of the elastic arms is constant throughout a body of the elastic arm.

11. The elastic retaining member according to claim 1, further comprising an attachment point for attachment to the horological component.

12. The elastic retaining member according to claim 1, wherein the retaining member is a collet for fastening the horological component to the support element.

13. The elastic retaining member according to claim 1, wherein the retaining member is a collet for fastening a balance-spring to a balance-staff.

14. The elastic retaining member according to claim 1, wherein the retaining member is made of a silicon-based material.

15. A combined elastic retaining member—horological component unit for a horological movement of a timepiece, comprising:

the elastic retaining member according to claim 1.

16. The unit according to claim 15, wherein the unit is a one-piece unit.

17. An assembly for a horological movement of a timepiece comprising:

the unit according to claim 15, wherein said unit is fastened to the support element.

18. A horological movement comprising:

at least one of the assembly according to claim 17.

19. A timepiece comprising:

the horological movement according to claim 18.

20. A method for producing the assembly according to claim 17, comprising:

inserting the support element into the opening of the elastic retaining member of said unit, said inserting comprising elastically deforming the elastic retaining member provided with a phase of displacing the rigid arms of the elastic retaining member inducing a two-fold elastic deformation of the elastic arms of the elastic retaining member; and fastening the retaining member to the support element, including carrying out radial elastic gripping of the retaining member on the support element.

21. The elastic retaining member according to claim 1, wherein the rigid arms are non-deformable or quasi-non-deformable, the elastic arms are deformable, and each of the elastic arms is connected, at opposite ends of the elastic arm, at the connection zones to one of the rigid arms.

* * * * *